United States Patent
Logan

[15] 3,701,510
[45] Oct. 31, 1972

[54] ELEVATIONAL POSITIONING AND SUPPORTING DEVICE

[72] Inventor: James Rollin Logan, 2229 Logan Court, Modesto, Calif. 95351

[22] Filed: Sept. 14, 1970

[21] Appl. No.: 72,017

[52] U.S. Cl. ................254/47, 254/178, 296/23 MC
[51] Int. Cl. .............................................B66f 7/26
[58] Field of Search .........214/515, 517; 296/23 MC; 254/47, 48, 178

[56] References Cited

UNITED STATES PATENTS

| | | |
|---|---|---|
| 514,262 | 2/1894 | Denton..................254/178 X |
| 599,769 | 3/1898 | Crosby...................254/178 X |
| 1,874,077 | 8/1932 | Anderson..................254/178 |
| 3,248,083 | 4/1966 | De Gennaro et al...214/515 X |
| 2,480,150 | 8/1949 | Lofstrand..............254/178 X |

Primary Examiner—Robert G. Sheridan
Attorney—Huebner & Worrel

[57] ABSTRACT

An elevational positioning and supporting device for mounting and demounting a camper on the bed of a pickup truck or the like providing a plurality of spaced substantially upright support legs having a plurality of elongated flexible tension members suspended therefrom in supporting relation to the camper with actuating means on the camper engageable with the tension members to vary their effective lengths slidably to raise and lower the camper on the support legs and counterbalancing means operably associated with the actuating means to overcome the force of gravity acting upon the camper to maintain it in any desired elevational position on the support legs throughout its entire range of movement thereon.

3 Claims, 5 Drawing Figures

JAMES R. LOGAN
INVENTOR

Huebner & Worrel
ATTORNEYS

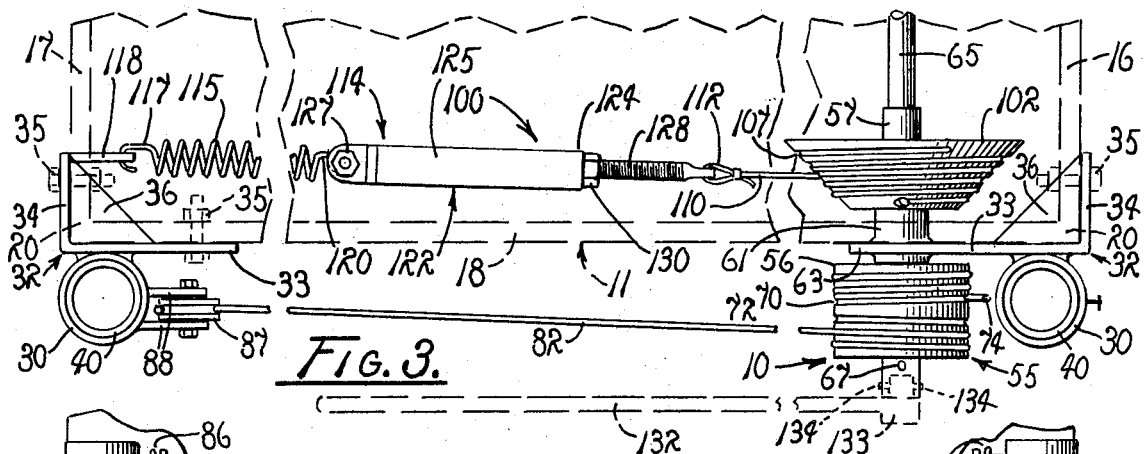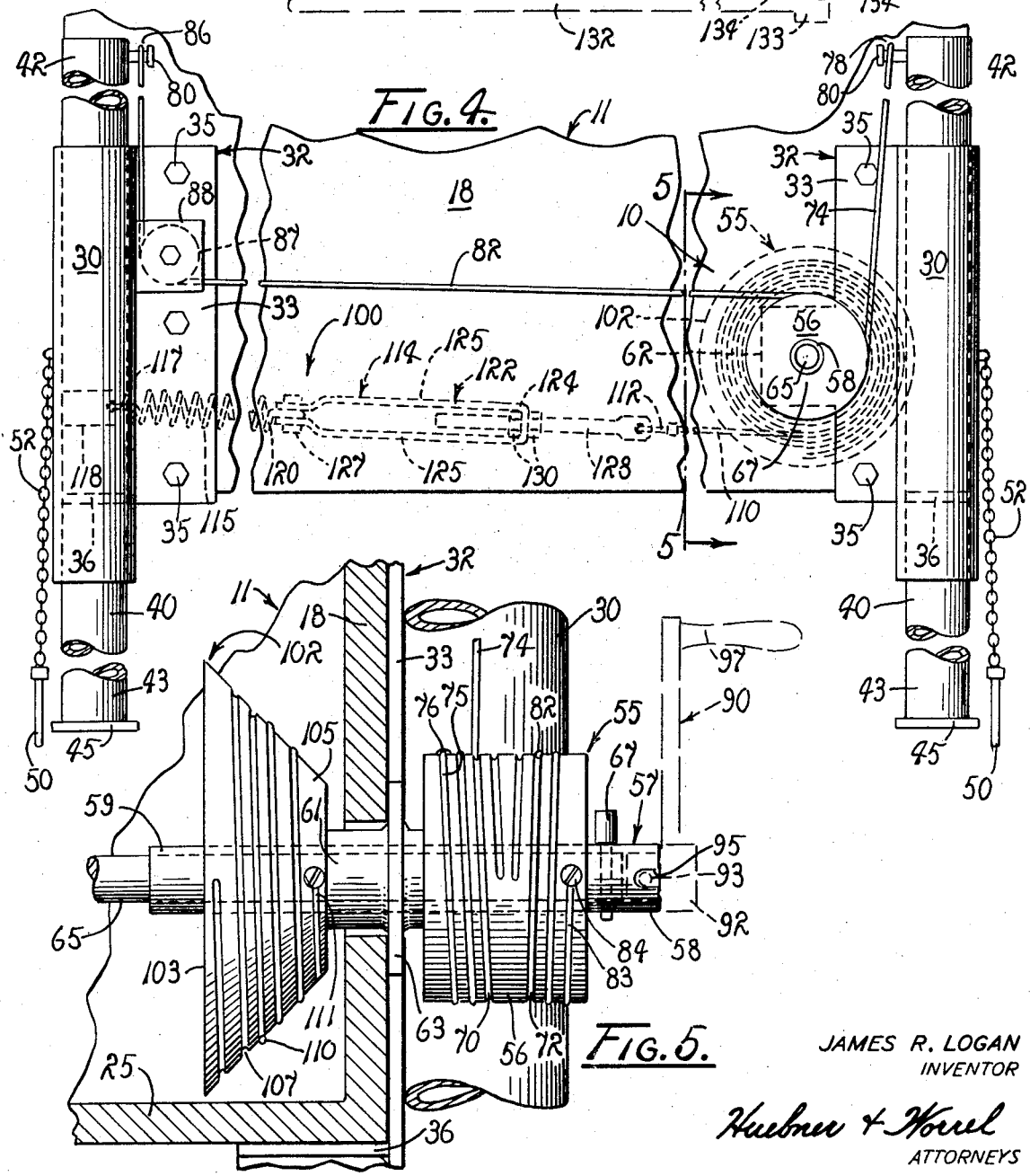

3,701,510

ELEVATIONAL POSITIONING AND SUPPORTING DEVICE

BACKGROUND OF THE INVENTION

Various devices for mounting and demounting a camper on the bed of a pickup truck or the like are commercially available. These include a plurality of relatively long support legs on which the camper is supported during periods of non-use when removed from the pickup truck. The camper must be supported at the upper ends of the legs in a sufficiently elevated position to permit the bed of the pickup truck to be positioned beneath the camper for mounting which elevated position constitutes a substantial hazard during its storage in a garage or the like. The conventional raising and lowering devices of the prior art frequently provide bulky, complicated gear systems which are expensive and difficult to operate with any degree of ease. They must necessarily provide a relatively high gear reduction for reducing the physical effort involved in manually motivating the substantial weight of the camper. This requires extensive manipulation of the control mechanism to obtain a relatively small amount of camper movement which is both tedious and time-consuming.

SUMMARY OF THE INVENTION

Accordingly, it is an object of the present invention to provide an improved elevational positioning and supporting device.

Another object is to provide such an improved elevational positioning and supporting device for load members which is particularly adapted for mounting and demounting campers on the beds of pickup trucks and the like.

Another object is to provide an improved elevational positioning and supporting device of the character described which is easily and conveniently manipulatable with virtually no physical effort.

Another object is to provide an improved elevational positioning and supporting device which is readily adapted for mounting existing campers on pickup trucks with a minimum of modification to both.

Another object is to provide an elevational positioning and supporting device which permits the campers on which it is installed to be stored when not in use in a relatively low, safe position adjacent to the ground but which is quickly elevatable to a truck mounting position with a minimum of effort.

Another object is to provide an improved elevational positioning and supporting device which can be conveniently adjusted to a transport position on the truck which need not be removed from the camper during use so as to be ready for subsequently demounting the camper in a minimum of time.

Another object is to provide an improved elevational positioning and supporting device which utilizes a plurality of support legs releasably mounted on the camper between locked ground engaging support positions and elevated transport positions on the camper.

Another object is to provide an improved elevational positioning and supporting device which has a plurality of elongated flexible cables suspending the camper from the legs and actuating sheaves engaging the cables to raise and lower the camper on the support legs.

Another object is to provide an improved elevational positioning and supporting device which utilizes a counterbalancing system in operable association with the cables and sheaves precisely to balance the weight of the camper throughout the entire range of its elevational movement on the support legs.

Another object is to provide an elevational positioning and supporting device in which the counterbalancing system associated therewith includes an elongated tension spring connected to a frusto-conical helically grooved sheave by an elongated flexible cable windable thereabout to provide a variable lever arm for maintaining the force of the spring constant throughout the entire range of elevational movement of the camper.

Other objects and advantages of the present invention will subsequently become more clearly apparent upon reference to the following description and accompanying drawings.

BRIEF DESCRIPTION OF THE DRAWINGS

FIG. 3 is a somewhat enlarged fragmentary top plan view of the actuating mechanism for the camper mounting and demounting device of the present invention.

FIG. 4 is a somewhat enlarged fragmentary side elevation of the actuating mechanism of FIG. 3 with portions thereof removed for illustrative convenience.

FIG. 5 is a further enlarged fragmentary transverse vertical section of the actuating mechanism, taken generally along the line 5—5 of FIG. 4.

DESCRIPTION OF THE PREFERRED EMBODIMENT

Figure 1:
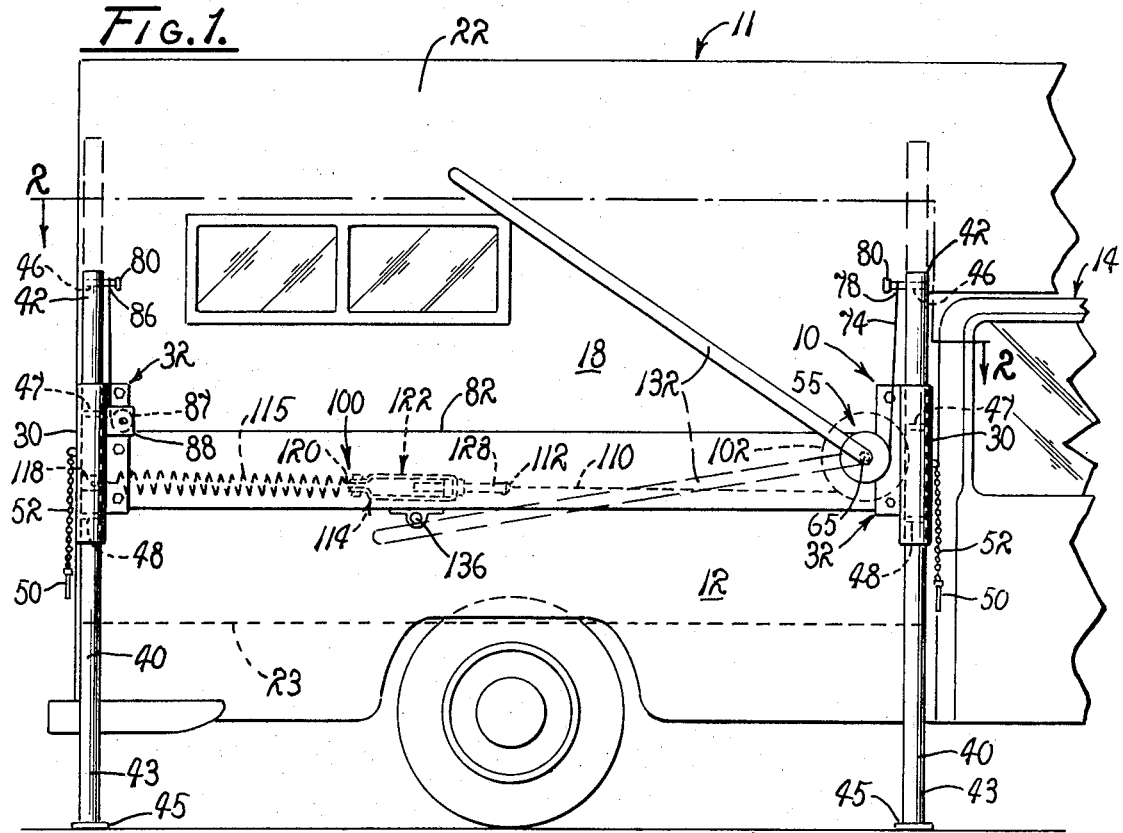
FIG. 1 is a side elevation of the camper mounting and demounting device embodying the principles of the present invention having a plurality of support legs disposed in ground engagement supporting a camper upon the bed of a pickup truck.

Referring more particularly to the drawings, an elevational positioning and supporting device embodying the principles of the present invention is generally indicated by the reference numeral 10 for mounting and demounting a camper 11 on the bed 12 of a pickup truck 14 or the like. The camper includes opposite forward and rearward walls 16 and 17, respectively, and opposite side walls 18 right-angularly related and interconnected at corners 20. The camper further includes a relatively wide upper portion 22 and a relatively narrow lower portion 23 which provide an elongated shelf 25 along each side wall 18 thereof. When mounted, the lower portion of the camper is disposed within the bed 12 of the pickup truck 14 with the shelves 25 rested upon the upper edges of the sides of the bed with the side walls 18 of the camper disposed in overhanging relation thereto.

The elevational positioning and supporting device 10 provides a plurality of elongated tubular leg guiding sleeves 30 which are individually secured to the corners 20 of the camper by L-shaped brackets 32. Each of the brackets provides right-angularly related plates 33 and 34 secured to their adjacent walls of the camper by a plurality of bolt and nut assemblies 35. A triangular gusset plate 36 is disposed in interconnecting relation adjacent to the lower edges of the plates and is extended beneath the shelf 25 of its respective corner 20 of the camper.

An elongated camper support leg 40 is slidably extended through each of the sleeves 30 and provides opposite upper and lower ends 42 and 43, respectively. The lower end of the leg mounts a substantially flat square ground engaging plate 45 and has a plurality of longitudinally spaced transversely extended bores 46, 47 and 48 formed therethrough adjacent to its upper end 42. A leg lock pin 50 is suspended on an elongated chain 52 from each of the sleeves 30 for selective receipt of the pin through the lowermost bore 48 in its associated support leg to hold it in the elevated transport position shown in dashed lines in FIG. 1 by engagement of the ends of the pin with the upper end of their respective sleeves 30.

The elevational positioning and supporting device 10 of the present invention further provides a camper actuating mechanism 55 on each side of the camper 11 including a pair of primary cable sheaves 56 individually disposed rearwardly adjacent to the forward leg guiding sleeves 30. Each of the primary sheaves is individually mounted upon a spindle 57 having opposite outer and inner ends 58 and 59, respectively. The spindles are individually rotatably mounted on a bearing 61 extended through a rearward extension 62 of the plate 33 of the forward sleeve mounting bracket 32. The bearing is held in such position by an integral annular flange 63 secured, as by welding or the like, within a circular bore in the plate extension 62 or, alternatively, may be bolted to the adjacent side wall 18 of the camper. An elongated shaft 65 is slidably extended through each of the sheave spindles 57 and provides opposite ends terminating short of the outer ends 59 thereof. A lock pin 67 is releasably extended through the outer ends of each spindle and through the associated end of the shaft 65 to permit either simultaneous or selective individual rotation of the primary sheaves 56 at the opposite sides of the camper for a purpose subsequently to be described.

Each of the primary sheaves 56 has a pair of inner and outer spiral grooves 70 and 72, respectively, formed in the outer periphery thereof. An elongated substantially flexible forward cable 74 provides an end 75 anchored to one end of the inner spiral groove 70 by any suitable fastener means such as welding, bolting or the like indicated by the reference numeral 76. The forward cable 74 includes an opposite looped end 78 which is releasably connectable to the upper end of its respective support leg 40 by a lock pin 80 extended through the uppermost bore 46 therein.

A rearward cable 82 is wrapped about the outer spiral groove 72 of each of the primary sheaves 56 and has an anchor end 83 secured thereto as by bolting, welding or the like as at 84. The rear cable includes an opposite looped end 86 which is trained about an idler pulley 87 rotatably mounted between a pair of brackets 88 forwardly extended from the rearwardly disposed leg guiding sleeves 30. The rearward cable is upwardly extended therefrom for connection to the upper end of its respective support leg 40 by another of the lock pins 80 releasably extended through the uppermost bore 46 in the support leg 40.

Figure 2:
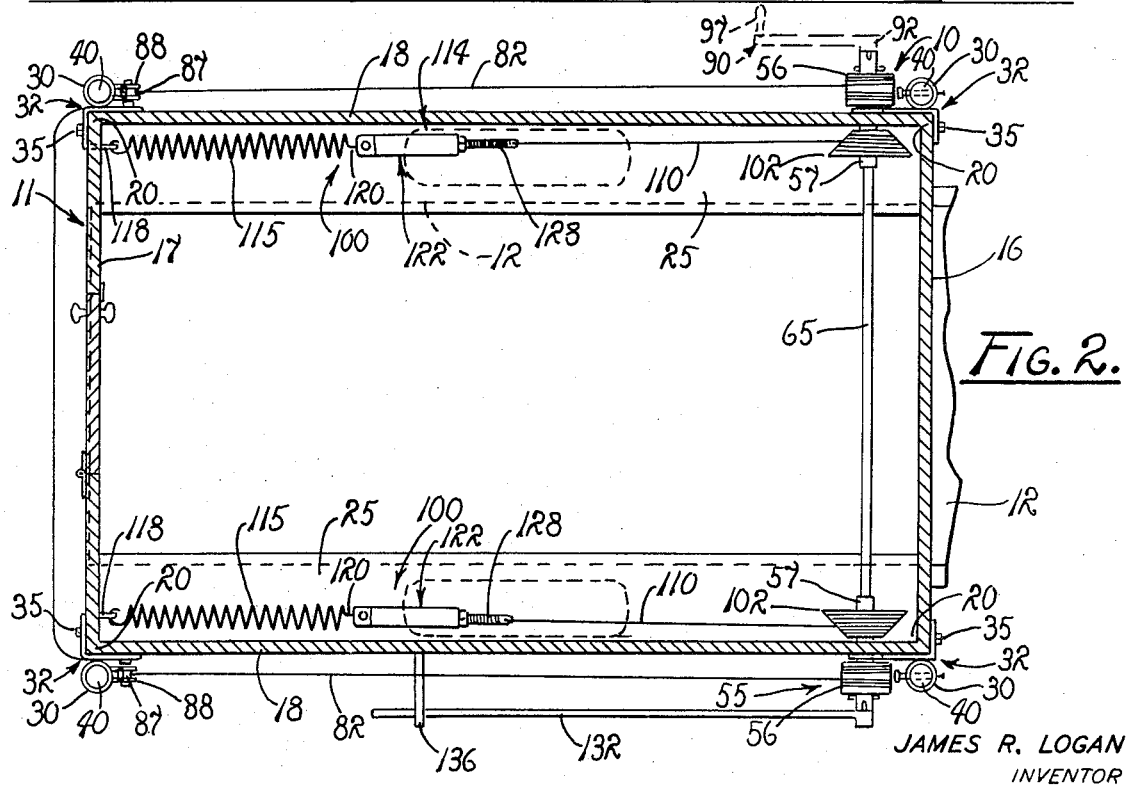
FIG. 2 is a substantially horizontal longitudinal section through the camper mounting and demounting device, taken generally along the line 2—2 of FIG. 1.

A crank, indicated by the dashed lines at 90 in FIGS. 2 and 5, is employed for manually rotating the primary sheaves 56 from either side of the camper when the lock pins 67 are both in place adjacent to their individual sheaves. The crank has an inner drive end 92 provided with outwardly extended diametrically opposed drive pins 93 receivable within a pair of notches 95 in the outer ends of the primary sheave spindles 57. The crank includes an outer handle end 97 by which the primary sheaves are rotated to wind and unwind the front and rear cables 74 and 82 on their respective inner and outer spiral grooves 70 and 72 on the primary sheaves.

The above described rotation of the handle 90 enables the effective length of the cables to be varied for raising and lowering the camper by elevational sliding movement of the guide sleeves 30 upon the support legs 40. It will be noted that rotation of the primary sheaves in a clockwise direction, as viewed in FIGS. 1 and 4, causes the cables to be wound about their respective grooves in the sheaves in order to shorten their effective lengths and to elevate the camper in spaced position above the bed 12 of the pickup truck 14. Upon rotation of the primary sheaves in a counterclockwise direction, the cables are unwrapped from their respective spiral grooves and the effective lengths of the cables are lengthened to lower the camper.

In order that the above described raising and lowering of the camper can be accomplished with a minimum of effort, a camper counterbalancing system, generally indicated by the reference numeral 100, is operatively associated with the camper actuating mechanism 55 on each side of the camper 11 individually above the shelves 25. While the counterbalancing system is shown disposed within the walls of the camper, it should be noted that on some models or types of campers it may be more convenient to locate such system on the outside walls if necessary or desired. Such counterbalancing system provides a frusto-conical sheave 102 which is mounted on the inner end 59 of each of the spindles 57 inwardly adjacent to the side wall 18 of the camper 11 and immediately above the shelf 25. The frusto-conical sheave provides a relatively large diameter end 103 and an opposite relatively smaller diameter end 105. A spiral groove 107 is formed in the outer periphery of the frusto-conical sheave within which an elongated flexible cable 110 is trained with the cable having an end secured to the periphery of the sheave as at 111 by welding, bolting or the like. The cable further includes an opposite rearwardly extended looped end 112 which is connected to the forward end of an adjusting device 114 for the counterbalancing system 100.

The counterbalancing system further includes an elongated tension spring 115 having a rearward end 117 connected to a forwardly extended bracket 118 on the sleeve mounting bracket plate 34. The spring has an opposite forward end 120 which is connected to the rearward end of the counterbalancing system adjusting device 114. The adjusting device includes an elongated frame 122 having a forward screw thread apertured end 124 and a pair of elongated spaced substantially parallel side bars 125 secured at their rearward ends by a bolt and nut assembly 127 connecting them to the forward end 120 of the tension spring 115. An elongated adjusting bolt 128 is screw-threadably extended through the forward apertured end 124 of the adjusting frame between the side bars 125 thereof and has a forward end providing an aperture through which the looped end 112 of the cable 110 is disposed. A pair of lock nuts 130 are disposed upon the adjusting bolt on opposite sides of the forward apertured end of the frame securely to hold the adjusting bolt in its selected axially adjusted position to vary the tension on the spring 115 in precisely corresponding relation to the force of gravity acting upon the camper 11 imposed through the primary sheaves 56 and cables 74 and 82 tending to lower the camper on the support legs 40.

As best shown in FIG. 4, the force of the spring 115 acting through the cable 110 tends to rotate the primary sheaves in a clockwise direction which, if greater than the force of gravity acting upon the camper, would tend to raise the camper on the support legs 40. However, as described, the adjusting device 114 is manipulatable in order precisely to counterbalance the camper so that it can be raised or lowered by appropriate manipulation of the crank 90 with virtually no effort and with the counterbalancing system maintaining the camper in any desired elevational position throughout its entire range of movement without additional locking mechanisms. Any number of tension springs 115 may be employed when necessary to counterbalance campers of a larger size than that shown in the present drawings.

When mounting the camper 11 on the bed 12 of the pickup truck 14, it is necessary temporarily to further tension the spring 115 of the counterbalancing system 100 in order to relieve the weight of the camper from the cables 74 and 82. This is necessary in order to provide sufficient slack in the cables to permit the removal of the lock pins 80 from the upper bores 46 of the support legs 40 which enables the full weight of the camper to be rested upon and be absorbed by the bed 12 of the pickup truck 14. This is easily and conveniently accomplished by the use of the elongated lever 132 shown in FIGS. 1, 2 and 3 having an operating end 133 providing diametrically opposed drive pins 134 receivable within the notches 95 in the outer ends of the spindles 57.

In view of the strength of the tension springs 115 required on relatively larger campers, the cables 74 and 82 may be slackened on only one side of the camper at a time by removal of the lock pin 67 in the spindle 57 and shaft 65 of the selected side of the camper in order to disconnect it from the counterbalancing system on the opposite side of the camper. Upon movement of the lever 132 from its full line to its dashed line position of FIG. 1, the primary sheave is rotated relative to the shaft 65 in a counterclockwise direction, as viewed in FIG. 1, further to tension the spring 115 for providing the desired slack in the cables 74 and 82. The counterbalancing system is temporarily maintained in such condition by hooking the outer end of the lever beneath an outwardly extended latching rod 136 on the camper.

After the above described removal of the lock pins 80 from their respective bores 46 in the upper ends 42 of the support legs 40, the support legs are manually raised by sliding through their respective guiding sleeves 30 to the transport positions shown in dashed lines in FIG. 1. The cable lock pins 80 are then reinserted in the intermediate bores 47 of their respective legs and the lock pins 50 inserted through the lowermost bores 48 with their ends engaging the upper ends of the sleeves 30 dependably to maintain the support legs in the described transport positions. After securely bolting the camper 11 to the bed of the pickup truck 14, the lever 132 is removed and mounted on the spindle 57 on the opposite side of the camper for repeating the above described cable loosening operation and manipulation of the support legs to their elevated transport positions.

OPERATION

The operation of the described embodiment of the subject invention is believed to be clearly apparent and is briefly summarized at this point. The camper 11 is normally disposed in closely spaced relation to the ground for greater stability during storage so as to minimize any possibility of toppling to preclude damage to the camper and other objects closely adjacent thereto. The lowermost position of the camper on the support legs 40 depends upon the length of the support cables 74 and 82 which, in such lower position, are extended to their full length completely unwrapped from their respective primary sheaves 56.

In order to elevate the camper 11 on the support legs 40, the crank 90 is installed on the outer end 58 of the spindle 57 on either side of the camper with both lock pins 67 installed through their respective spindles and the shaft 65. The crank is manipulated to rotate the primary sheaves 56 in a clockwise direction, as viewed in FIGS. 1 and 4, which causes the cables 74 and 82 to be wrapped about their respective spiral grooves 70 and 72 to shorten their effective length thereby to raise the camper. This is accomplished with a minimum of effort by the assistance of the counterbalancing system 100 which, as described, continually imposes a force substantially equal and opposite to the force of gravity acting upon the camper. This is precisely adjusted by the adjusting device 114 which enables the tension of the spring 115 to be pre-set so that the camper is maintained in any desired elevational position throughout its entire range of movement. This is accomplished by the frusto-conical sheave 102 which, as described, is simultaneously rotated with the primary sheaves 56. The spring cable 110 within the spiral groove 107 of the frusto-conical sheave is unwrapped therefrom during the above described rotation of the primary sheaves in a clockwise direction to raise the camper. Such unwrapping of the spring cable 110 continually reduces the tension of the counterbalancing spring 115 but such reduction is compensated for by the advancement of the cable along the increasing diameter of the frusto-conical sheave which provides an increasingly longer lever arm between the cable on the periphery of the sheave and its axis of rotation. Accordingly, the continually increasing lever arm provided by the advancement of the spring cable toward the large diameter end 103 thereof precisely counteracts the reduction in tension on the spring to maintain the force of the counterbalancing system acting upon the camper substantially constant throughout the entire range of movement.

After the camper 11 is elevated sufficiently, the bed 12 of the pickup truck is positioned therebeneath and the camper lowered by reverse rotation of the primary sheaves in a counterclockwise direction, as viewed in FIGS. 1 and 4. Such rotation unwraps the support cables 74 and 82 from the primary sheaves to permit downward sliding movement of the camper upon the support legs 40. During such rotation of the primary sheaves, the frusto-conical sheave 102 is rotated to cause wrapping of the spring cable 110 thereabout with the cable advancing from the large diameter end 103 thereof toward the small end 105. Accordingly, as the cable 110 wraps about the frusto-conical sheave, the greater tension imposed upon the spring 115 is precisely compensated for by the increasingly shorter lever arm provided between the cable on the periphery of the sheave and its axis of rotation. Accordingly, in either direction of movement, the spring force acting upon the camper is substantially constant and in precise counterbalancing relation to the force of gravity acting upon the camper.

Upon engagement of the bottom of the camper 11 with the bed 12 of the pickup truck 14, the weight of the camper is not immediately transferred to the bed of the pickup truck because of the counterbalancing system 100 tending to elevate the camper. In order to relieve the weight of the camper and permit such weight to be absorbed by the bed of the pickup truck, the lever 132 is mounted on the outer end 58 of the spindle 57 at either side of the camper in place of the crank 90 in order to provide sufficient leverage further simultaneously to compress both springs 115 by manipulation of the lever from its full line position of FIG. 1 to its dashed line position. This is, of course, possible only with relatively light-weight campers in which the combined force of both springs of the counterbalancing system is sufficiently light to be easily overcome by the lever arm provided by the lever 132. The lever is temporarily held in the spring tensioning dashed line position by hooking the outer end thereof beneath the latching rod 136. Such manipulation of the lever rotates the primary sheave 56 in a counterclockwise direction to place sufficient slack in the support cables 74 and 82 as the weight of the camper is taken by the bed of the pickup truck to permit removal of the cable lock pins 80 and to raise the support legs 40 to their upwardly disposed dashed line transport positions. The cable lock pins 80 are then inserted in the intermediate bores 47 in the support legs and the lock pins 50 disposed through the lowermost bores 48 therein for engagement with the upper ends of the sleeves 30 to maintain the legs in their elevated transport positions. After securely bolting the camper to the bed of the pickup truck in the usual manner, the lever 132 is unlatched from the rod 136, returned to its upper full line position of FIG. 1, and removed for subsequent use. As previously described when a relatively heavier camper is being mounted, the combined force of both springs 115 may be too strong easily to be overcome by the described operation of the lever 132 from one side of the camper with both lock pins 67 installed. Accordingly either lock pin may be removed so as to disconnect the counterbalancing system at the opposite sides of the camper from each other for individual attention in the above described manner.

In view of the foregoing, it is readily apparent that the structure of the present invention provides an improved elevational positioning and supporting device particularly adapted for mounting and demounting campers on the beds of pickup trucks and the like. The elevational positioning and supporting device of the present invention further makes possible the mounting and demounting of the campers in a relatively few minutes with a minimum of physical effort. The device need not be removed from the camper during its use so as to be immediately available for subsequent demounting of the camper from the bed of the pickup truck. Such device further enables the camper to be stored when not in use on the pickup truck in a convenient, safe position closely adjacent to the ground and in condition for immediate use for mounting a camper with a minimum of preparation. The device of the present invention may be economically manufactured and is readily adapted for use on virtually any type of new or existing camper or any load member which is required to be elevationally positioned. The camper is counterbalanced at all times by the tension spring of the counterbalancing system employed by the present invention with the variable lever arm provided by the frusto-conical sheave insuring such precise counterbalancing throughout the full range of elevational movement of the camper or other load member.

Although the invention has been herein shown and described in what is conceived to be the most practical and preferred embodiment, it is recognized that departures may be made therefrom within the scope of the invention, which is not to be limited to the illustrative details disclosed.

Having described my invention, what I claim as new and desire to secure by Letters Patent is:

1. An elevational positioning and supporting device for mounting and demounting a camper on the bed of a pickup truck comprising a front and a rear sleeve mounted in erect positions on opposite sides of the camper; support legs slidably mounted in the sleeves having lower ends disposed for ground engagement and upper ends disposed above their respective sleeves; a shaft rotatably mounted transversely on the camper rearwardly adjacent to the front sleeves; a front sheave rigidly mounted on the shaft adjacent to each of the front sleeves; a rear sheave rotatably mounted on the camper forwardly adjacent to each of the rear sleeves; a cable connected to the upper end of each leg in each front sleeve, extended downwardly under its respectively adjacent front sheave and secured thereto; a cable connected to the upper end of each leg in each rear sleeve, extended downwardly about its respectively adjacent rear sheave, thence forwardly over the front sheave on the same side of the camper and secured to said front sheave; and means for rotating the shaft to raise and to lower the camper on the legs.

2. The device of claim 1 including energy storing means connected to the shaft and urging the shaft in the rotational direction to tension the cables and counterbalance the weight of the camper substantially equally on opposite sides thereof.

3. The device of claim 1 for campers having forward ends and pickup trucks having sides of predetermined height in which the shaft is mounted in the camper adjacent to its front end and at an elevation above the sides of the truck when the camper is mounted therein.

* * * * *